ꟼ 94894
*Francis Kemlo.*
*Impd Fish-Hook*
PATENTED
SEP 14 1869
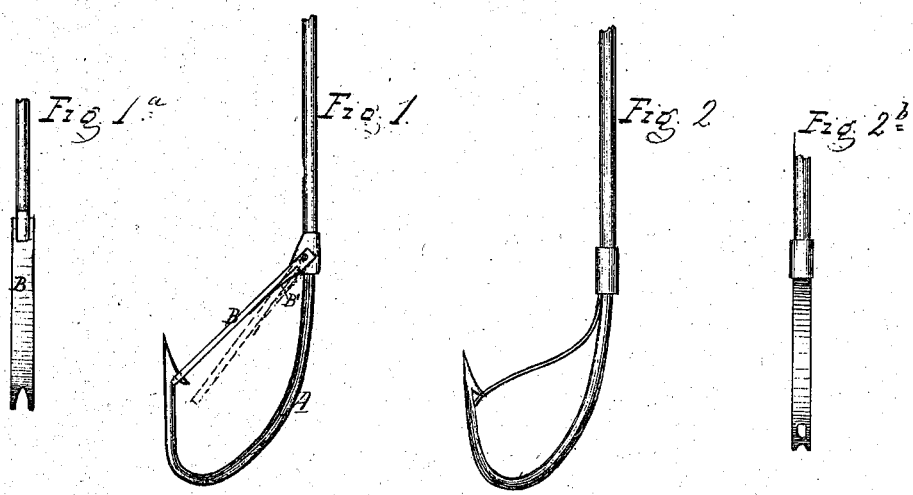
Attest
F. H. Sprague
C. T. Clausen.
F. Kemlo
Inventor
D. P. Holloway & Co
Atty

United States Patent Office.

FRANCIS KEMLO, OF BOSTON, MASSACHUSETTS.

Letters Patent No. 94,894, dated September 14, 1869.

IMPROVEMENT IN FISH-HOOKS.

The Schedule referred to in these Letters Patent and making part of the same.

To all whom it may concern:

Be it known that I, FRANCIS KEMLO, of Boston, in the county of Suffolk, and the State of Massachusetts, have invented a new and useful Improvement in Fish-Hooks; and I do hereby declare that the following is a full and exact description of the same, reference being had to the accompanying drawings, and to the letters of reference marked thereon.

Figures 1 and 1ª represent front and side views of my improved fish-hook, and

Figures 2 and 2ᵇ represent similar views of a modification thereof.

The nature of my invention consists in constructing a fish-hook with a spring-lock for retaining the fish after it has been hooked.

In angling with the ordinary kind of hooks, many fish are lost after they have been hooked, because the pull of the angler, together with the effort of the fish to escape, will tear a long slit in its jaw, through which the hook then often slips, releasing the fish.

To prevent this, I attach to the stem or shank of a hook, A, as shown in the drawings, a hinged bar, B, actuated by a spring, B', the tendency of which shall be to throw the bar across the opening, between the shank and the barb-end of the hook.

One end of this bar or lock is permanently hinged to a boss upon the shank in such a manner, that as the other slotted end is pushed up by the spring to near the point of the hook, its further movement shall be checked by a projection of the boss against which the bar abuts.

To prevent any side movement of the lock after it has closed the hook, its outer end is slotted, enabling it to embrace the hook.

To insure the proper operation of the lock, it is necessary that the pointed barb-end of the hook should be much longer than it is now made, so that the lock can pass the fish's jaw.

The operation is as follows:

When the point of the hook has penetrated the fish's jaw, the lock will be pushed downward and backward by it. If now, by the struggle of the fish to get away, or by the pull of the fisherman, a slit be torn in its jaw, the outer loose end of the lock will pass out of the mouth of the fish, and at once be thrown up by the spring and close the hook, thus making it impossible for the fish to escape, unless its jaw be torn in two.

In the modification shown in figs. 2 and 2ᵇ, the hinged bar is dispensed with, and the spring serves to close the hook, one end of it in this case being secured to the shank, while its other end is slotted for the same purpose as the bar, and also provided with an eye to catch over the barb of the hook to prevent its further upward movement.

Having thus described my invention,

What I claim, and desire to secure by Letters Patent, is—

A fish-hook, constructed with a long barb-end, and provided with a spring-lock, for retaining a fish after it has been hooked, substantially as shown and described.

In testimony whereof, I have signed my name to this specification, in the presence of two subscribing witnesses.

FRANCIS KEMLO.

Witnesses:
  GEORGE W. GOSS,
  FRANCIS A. PERRY.